(12) United States Patent
Capelle et al.

(10) Patent No.: US 10,408,676 B2
(45) Date of Patent: Sep. 10, 2019

(54) LONG-PULSE-WIDTH VARIABLE-WAVELENGTH CHIRPED PULSE GENERATOR AND METHOD

(71) Applicant: National Security Technologies, LLC, North Las Vegas, NV (US)

(72) Inventors: Gene A. Capelle, Santa Barbara, CA (US); Daniel K. Frayer, Los Alamos, NM (US)

(73) Assignee: Mission Support and Test Services, LLC, Las Vegas, NV (US)

( * ) Notice: Subject to any disclaimer, the term of this patent is extended or adjusted under 35 U.S.C. 154(b) by 61 days.

(21) Appl. No.: 15/284,399

(22) Filed: Oct. 3, 2016

(65) Prior Publication Data
US 2017/0122806 A1    May 4, 2017

Related U.S. Application Data

(60) Provisional application No. 62/236,096, filed on Oct. 1, 2015.

(51) Int. Cl.
*G01J 3/10* (2006.01)
*G01J 3/02* (2006.01)
(Continued)

(52) U.S. Cl.
CPC .............. *G01J 3/10* (2013.01); *G01J 3/0208* (2013.01); *G01J 3/0218* (2013.01);
(Continued)

(58) Field of Classification Search
CPC .......... G01J 3/0208; G01J 3/0218; G01J 3/10; G02B 27/1006; H01S 3/005;
(Continued)

(56) References Cited

U.S. PATENT DOCUMENTS

| 1,438,360 A | 12/1922 | Churchill |
| 2,800,641 A | 7/1957 | Falge et al. |

(Continued)

FOREIGN PATENT DOCUMENTS

| DE | 105005006723 | 6/2006 |
| EP | 1000581 | 5/2000 |

(Continued)

OTHER PUBLICATIONS

U.S. Appl. No. 14/214,234, Robert M. Malone, et al., filed Mar. 14, 2014.

(Continued)

*Primary Examiner* — Tsion Tumebo
(74) *Attorney, Agent, or Firm* — Weide & Miller, Ltd.

(57) ABSTRACT

A device for creating an optic pulse with different wavelengths separated by time. A pump laser is configured to output energy to a dye cell which, responsive to the energy, outputs an optic pulse. Mirrors direct the optic pulse away from the dye cell towards a spectrograph. The spectrograph has an input and two or more outputs. The spectrograph receives and converts the optic pulse to a wavelength separated optic signal presented on the two or more outputs. A first optic cable has an input end and an output end. The input end receives a first output from the spectrograph. A second optic cable has an input end and an output end. The input end receives a second output from the spectrograph. The second optic cable is a different length than the first optic cable to establish a time shift between the signals exiting the first and second cable.

19 Claims, 5 Drawing Sheets

(51) Int. Cl.
*H01S 3/094* (2006.01)
*H01S 3/00* (2006.01)
*H01S 3/213* (2006.01)
*H01S 3/08* (2006.01)

(52) U.S. Cl.
CPC .......... *H01S 3/08086* (2013.01); *H01S 3/213* (2013.01); *H01S 3/005* (2013.01); *H01S 3/0078* (2013.01); *H01S 3/094034* (2013.01); *H01S 3/094076* (2013.01)

(58) Field of Classification Search
CPC ............... H01S 3/0078; H01S 3/08086; H01S 3/094034; H01S 3/094076; H01S 3/213
USPC .................................................... 362/217.14
See application file for complete search history.

(56) References Cited

U.S. PATENT DOCUMENTS

| | | | |
|---|---|---|---|
| 4,166,695 A | 9/1979 | Hill et al. | |
| 4,243,881 A * | 1/1981 | Bethune | H01S 3/305 250/338.1 |
| 4,346,991 A | 8/1982 | Gardner et al. | |
| 4,743,110 A | 5/1988 | Arnaud et al. | |
| 4,887,310 A | 12/1989 | Meyzonnette et al. | |
| 4,902,888 A | 2/1990 | Kondo | |
| 4,929,080 A | 5/1990 | Burstyn | |
| 5,013,928 A | 5/1991 | Ikeda et al. | |
| 5,040,886 A | 8/1991 | Gunter | |
| 5,071,239 A | 12/1991 | Hoffman et al. | |
| 5,483,632 A | 1/1996 | Takamiya et al. | |
| 5,587,785 A | 12/1996 | Kato et al. | |
| 5,610,734 A | 3/1997 | Aharoni et al. | |
| 5,642,194 A * | 6/1997 | Erskine | G01P 3/366 356/28.5 |
| 5,682,262 A | 10/1997 | Wefers et al. | |
| 5,790,242 A | 8/1998 | Stern et al. | |
| 5,812,250 A | 9/1998 | Ishida et al. | |
| 5,912,257 A * | 6/1999 | Prasad | A61K 41/008 250/338.1 |
| 6,075,600 A | 6/2000 | Nagano et al. | |
| 6,180,946 B1 | 1/2001 | Ebstein | |
| 6,226,035 B1 | 5/2001 | Korein et al. | |
| 6,402,037 B1 * | 6/2002 | Prasad | A61K 41/008 235/454 |
| 6,542,226 B1 | 4/2003 | Wernet | |
| 6,727,980 B2 | 4/2004 | Ota et al. | |
| 6,762,827 B2 | 7/2004 | Aroussi et al. | |
| 7,015,484 B2 * | 3/2006 | Gillispie | G01J 3/4406 250/458.1 |
| 7,161,671 B2 | 1/2007 | Shibata et al. | |
| 7,224,540 B2 | 5/2007 | Olmstead et al. | |
| 7,385,692 B1 * | 6/2008 | Nguyen | G01J 3/02 356/301 |
| 7,397,549 B2 | 7/2008 | Williams et al. | |
| 7,569,838 B2 | 8/2009 | Watanabe et al. | |
| 7,741,601 B2 | 6/2010 | Noji et al. | |
| 7,800,072 B2 | 9/2010 | Yun et al. | |
| 7,933,010 B2 | 4/2011 | Rahn et al. | |
| 8,004,694 B2 | 8/2011 | Lee et al. | |
| 8,005,314 B2 | 8/2011 | Ortyn et al. | |
| 8,008,642 B2 | 8/2011 | Schweizer et al. | |
| 8,120,757 B2 | 2/2012 | Dede et al. | |
| 8,314,410 B2 | 11/2012 | Straw et al. | |
| 8,368,031 B2 | 2/2013 | Nakasuji et al. | |
| 8,587,772 B2 | 11/2013 | Sesko et al. | |
| 8,711,336 B1 | 4/2014 | Frogget et al. | |
| 2002/0158211 A1 * | 10/2002 | Gillispie | G01J 3/4406 250/458.1 |
| 2003/0022105 A1 * | 1/2003 | Prasad | A61K 41/008 430/270.15 |
| 2003/0231829 A1 | 12/2003 | Meyers et al. | |
| 2004/0007675 A1 * | 1/2004 | Gillispie | G01J 3/4406 250/458.1 |
| 2007/0156021 A1 | 7/2007 | Morse et al. | |
| 2010/0320382 A1 | 12/2010 | Almogy et al. | |
| 2012/0023503 A1 | 9/2012 | Hatakeyama et al. | |

FOREIGN PATENT DOCUMENTS

| | | |
|---|---|---|
| JP | 2011-085432 | 4/2011 |
| WO | WO 1996/041123 | 12/1996 |
| WO | WO 2001/098762 A1 | 12/2001 |
| WO | WO 2005/003813 A2 | 1/2005 |
| WO | WO 2009/118130 | 10/2009 |
| WO | WO 2009/153067 | 12/2009 |
| WO | WO 2011/161197 A1 | 12/2011 |

OTHER PUBLICATIONS

Rudy, R.J., et al. "Design of a Low-cost, Lightweight, Passively Cooled, Narrowband, SWIR camera for Space-Based Imaging", Report TR-2003(8570)-10, Aerospace Corp., El Segundok, CA. Lab. Operations., 19 pages, Jul. 2003.

"Ultra-high-speed optical coherence tomography with a stretched pulse supercontinuum source",Sucbei Moon and Dug Young Kim, Nov. 27, 2006, vol. 14, No. 24/Optics Express 11575, Nov. 27, 2006.

"Studies of the wind filtering effect of gravity waves observed at allahabad (25.45 N, 81.85 E) in India", G.K. Mukherjee, et al., Earth Planets Space, 62, 309-318, 2010, Mar. 4, 2010, 10 pages.

R. Malone, et al. "Design and assembly of a telecentric zoom lens for the Cygnus x-ray source", Proceedings of SPIE—The International Society for Optical Engineering, v 8488, 2012, Zoom Lenses IV; Article No. 84880B; Aug. 12, 2012-Aug. 13, 2012.

"Opto-mechanical design of a chromotomographic imager direct-vision prism element", Coon, T.E., Report: AFIT-ENY-13-M-07, 125p., Mar. 31, 2013.

"Tunable hyperchromatic lens system for confocal hyperspectral sensing" Phuong-Ha Cu-Nguyen, Adrian Grewe, Matthias Hillenbrand, Stefan Sinzinger, Andreas Eifert and Has Zappe, Optics Express, vol. 21, Issue 23, pp. 27611-27621 (2013), Dec. 31, 2013.

"Aspheric Lens" Wikipedia, the free encyclopedia, http://en.wikipedia.org/wiki/Asphere, Mar. 4, 2014, 6 pages.

* cited by examiner

LONG-PULSE-WIDTH VARIABLE-WAVELENGTH CHIRPED PULSE GENERATOR AND METHOD

2. PRIORITY CLAIM

This application claims priority to and the benefit of U.S. Provisional Patent Application No. 62/236,096 filed on Oct. 1, 2015, the contents of which are incorporated by reference in its entirety herein.

1. STATEMENT REGARDING FEDERAL RIGHTS

This invention was made with government support under Contract No. DE-AC52-06NA25946 and was awarded by the U.S. Department of Energy, National Nuclear Security Administration. The government has certain rights in the invention.

3. FIELD OF THE INVENTION

The invention relates to optic pulse generation and in particular to a method and apparatus for generating a wavelength dispersed pulse with wavelengths separated in time.

4. BACKGROUND

When performing scientific research or material interaction studies, it is often beneficial or necessary to generate a chirped optical pulse. A chirped pulse may be used to record or illuminate an event which occurs during an ultra-short time scale. A chirped pulse is a pulse of energy, such as in the UV, visible, or near-infrared regions of the spectrum, with different wavelengths of the pulse which are dispersed, spread or chirped. However, numerous challenges exist in relation to prior art attempts to generate a chirped pulse.

One prior art approach was using a long single fiber path to create dispersion, but this approach required large spools of fiber optic cable, which are heavy, expensive, space consuming, and very difficult to move. Another proposed solution is chirped fiber Bragg grating but this approach results in modulation on the group delay of CFBGs which leads to deviation of linearity of the dispersion. It is also known to use a rotating mirror/grating assembly, but this approach is slow and as a result does not meet the needs of applications requiring higher speed capabilities.

Therefore, a need exists for an improved system to generate a chirped pulse and in particular a chirped or chirped-like pulse that is selectable in wavelength, spectral width, and temporal width.

SUMMARY

This is a method for creating a chirped-like laser pulse that can be operated in the UV, visible, or near-infrared regions of the spectrum. The exemplary method of operation described below uses a pulsed broadband dye laser, wavelength dispersing element, and fiber-optic cables of varying lengths that terminate in a larger core recombining fiber or a simple connector to output a laser pulse that moves or is shifted in time and wavelength over the duration of the pulse. Total temporal and spectral pulse widths can be varied and made longer than what is available with prior art available chirped lasers. The device will have application anywhere a temporally longer chirped laser output might be desired or where a chirped output is needed in a specific spectral region. In one exemplary application, the purpose is to illuminate a rapidly (spatially) varying object, thus encoding temporal phenomena onto a wavelength for subsequent detection with compatible technology.

To overcome the drawbacks of the prior art, a device for creating an optic pulse with different wavelengths separated by time is disclosed. In one embodiment, this device includes a pulsed pump laser configured to output energy and a dye cell configured to receive the energy from the pump laser and, responsive to the energy, output an optic pulse. One or more mirrors are configured to direct the optic pulse away from the dye container towards a spectrograph. The spectrograph has an input and two or more outputs and the spectrograph is configured to receive the optic pulse on the input and convert the optic pulse to a wavelength separated optic signal that is presented on the two or more outputs. Also part of this embodiment is a first optic cable having an input end and an output end with the input end configured to receive a first output from the spectrograph, and a second optic cable having an input end and an output end such that the input end is configured to receive a second output from the spectrograph. The second optic cable has a different length than the first optic cable which establishes a time shift between the signals first and second cable output.

The device may further comprise a coupler configured to combine the light signal from the output end of the first optic cable and the second optic cable to a single path. In addition, it is also contemplated that the device may further comprise one or more lenses configured to focus the energy from the pump laser and one or more lenses configured to focus the output of the dye cell.

Also contemplated are additional optic cables having an input end and an output end such that the input end is configured to receive an additional output from the spectrograph and the additional optic cables have a different length than the first optic cable and the second optic cable. The output end of the first optic cable and the output end of the second optic cable may be contained in one or more SMA connectors or any other type of connector or fiber optic cable termination. It is contemplated that the device may further comprise a large core fiber arranged to accept the first output from the first optic cable and second output from the second optic cable. In one embodiment, the energy from the pump laser is a 10 ns pulse width at 532 nm wavelength. This device may further comprise a fiber core size larger than a slit width of the spectrograph.

Also disclosed is a device for creating an optic pulse with different wavelengths separated by time. One embodiment of this device includes a pulse generator configured to output an optic pulse and a wavelength dispersive device having an input and two or more outputs. The wavelength dispersive device is configured to receive the optic pulse on the input and convert the optic pulse to at least one wavelength separated optic signal that is presented on the two or more outputs. Also part of this device is a first optic cable having a first optic cable input and a first optic cable output. The first optic cable input is configured to receive a first output from the wavelength dispersive device and present a first optic cable output signal from the first optic cable output. A second optic cable is provided with a second optic cable input and a second optic cable output. The second optic cable input is configured to receive a second output from the wavelength dispersive device and present a second optic cable output signal from the first optic cable output. The second optic cable having a different length than the first optic cable thereby causing a time shift in the second optic cable output signal as compared to the first optic cable output signal. In this embodiment an optional fiber core is provided and configured to combine the first optic cable output signal and the second optic cable output signal onto a single core.

In one embodiment, this device further comprises one or more lenses configured to focus the energy from the pump laser and one or more lenses configured to focus the output of the dye cell. In one configuration, the second optic cable is 1.5 meters longer than the second optic cable. The energy from the pump laser may be a 10 ns pulse width at 532 nm wavelength. The disclosed device of this embodiment further comprising a fiber core size larger than a slit width of the spectrograph. In one configuration, the wavelength dispersive device is a spectrograph and the pulse generator generates a multiband multiple wavelength pulse.

Also disclosed is a method for generating a chirped optic pulse comprising generating a laser pulse such that the laser pulse includes two or more wavelengths. This method includes receiving the laser pulse at a wavelength dispersive device. The wavelength dispersive device spreads the laser pulse into at least a first output having a first wavelength, and a second output having a second wavelength. Then, receiving the first optic output on a first optic path and receiving the second optic output on a second optic path. The second optic path has a different length than the first optic path. Outputting a first path output from the first optic path and a second path output from the second optic path so that the first path output and the second path output form a chirped optic pulse.

In one embodiment, the step of generating a laser pulse comprises providing exciting energy to a dye cell and responsive to the exciting energy, the dye cell outputting the laser pulse. This method of operation may further comprise combining the first path output and the second path output onto a single fiber. In one embodiment, the wavelength dispersive device comprises a spectrograph. The first optic path and the second optic path may be formed from optic fibers.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
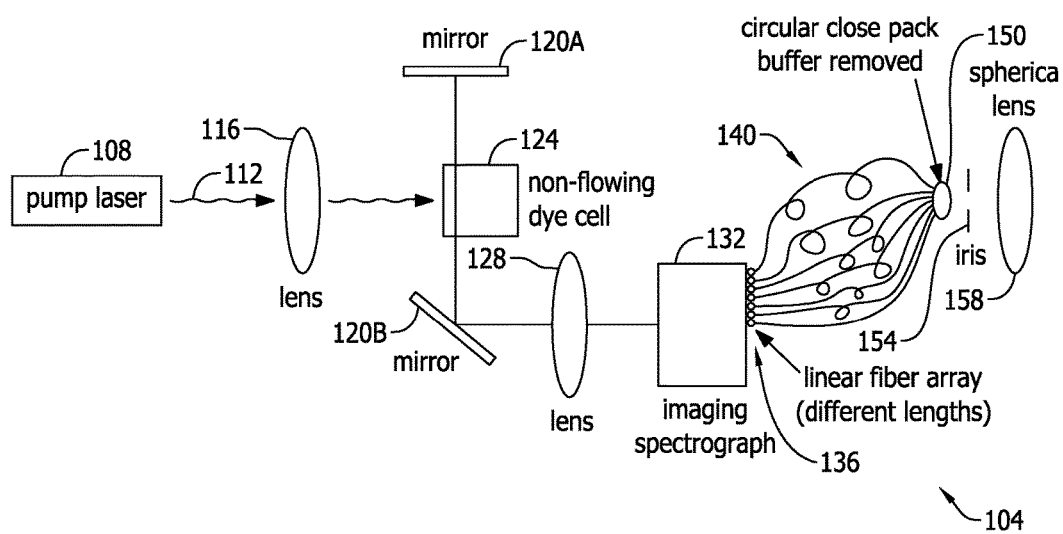
FIG. 1 illustrates one example embodiment of a chirped pulse generator.

To overcome the drawbacks of the prior art and to provide additional benefits, a Long-Pulse-Width, Variable-Wavelength "Chirped" Laser Pulse Generator is disclosed. FIG. 1 illustrates one example embodiment of a chirped pulse generator. This is but one possible configuration and it is understood that one of ordinary skill in the art will arrive at different configurations without departing from the scope of the claims. In general, this system produces a chirped or chirped-like pulse that is selectable in one or more: wavelength, spectral width, and temporal width. The long-pulse-width variable-wavelength device built to successfully demonstrate the concept is shown in FIG. 1.

As shown, the pulse generator 104 includes a pump laser 104 that generates a laser pulse 112. In other embodiments, any type of laser or light source may be used. The output of the laser 104 is presented to and focused by a lens 116, such as a cylindrical lens, to a dye cell 124. The dye cell may be liquid filled, solid such as a piece of plastic impregnated with dye. The cylindrical lens is configured to focus the output of the pump laser to a line, such as a linear pattern. The dye solution 124 may comprise a solvent at the appropriate concentration for lasing and may be contained in a container, such as but not limited to a 1 cm by 1 cm by 5 cm quartz cuvette. The pump laser 108 and dye container 124 operate in connection, using the pump laser to focus an exciting energy pulse to the dye cell which activates the dye cell to generate a wideband pulse. In other embodiments, other devices may be used to activate a second laser (dye cell) instead of the pump laser, such as but not limited to flash lamps or electrical discharge devices. Thus, the pulse source is not limited a dye laser as the luminous source. It is contemplated that any other multiple or broad spectral band, short temporal pulse width laser or other spectral light source would also work.

The dye cell emits a range of wavelength range, which may be referred to as broadband output. In other embodiments other devices may be used, such as a flash lamp dye laser, but it is preferred to have a broadband pulse source such as in one embodiment, 10 or 2 nanometers wide broadband pulse source. In other embodiments other pulse widths may be used.

The dye is chosen to provide the desired output wavelength range, and the pump wavelength is chosen accordingly for efficient dye pumping. In this embodiment, dye laser operates in the un-tuned wide-spectral-line-width mode, but in other embodiments, other modes of operation may occur.

Mirrors 120A, 120B are provided at the back of the laser cavity and the front to function as shown by reflecting the laser pulse to a spherical lens 128 that in turn focuses the light signal onto the slit of an imaging spectrograph 132.

As is understood, lasers need to have a cavity to oscillate in and an active medium, such as the dye in the dye cell 124. In this embodiment the back mirror 120A is close to the dye cell to provide feedback namely the light is reflected back into the dye cell, and overlaps light in the other direction toward the second mirror 120B, which in turn directs the output to the lens 128. The second lens 128 focuses the reflection from the mirror 120B from a generally round shape to a line. In one embodiment, lens 128 is a concentrator.

The imaging spectrograph 132 is a device configured to receive a broad or multiband input and output two or more optical outputs which are of different wavelength. In this embodiment, the spectrograph 132 has one input and seven outputs such that each output carries a different wavelength of light. In other embodiments a greater number of inputs may be used and a greater number or fewer number of outputs may be used. The input to the imaging spectrograph 132 comprises a multiband signal that includes two or more wavelengths and the output of the imaging spectrograph comprises the input with the wavelengths spread or separated in space. In other embodiments, a device besides a spectrograph or its components may be used such as any device that spreads the light input by wavelength. For example, a prism or prism effect device may be used, or grating with corrective optics, or anyway wavelength dispersive device.

The output fibers 140 align with different outputs of the spectrograph 132 to present the wavelength spread input signal to the linear fiber array 140. The fiber array is two or more lengths of fiber, each of which receive the optical output of the imaging spectrograph 132. The linear fiber array positioned at the spectrograph output image plane is adjusted to center the light on the fiber array. At the other end of the fiber bundle, two or more of the fibers are terminated in an SMA connector (not shown) or any other type of connector or termination. A SMA connector 136 is a connector type that terminates an optic fiber 140. The optic fibers 140, or fiber extensions which connect to the fibers, are of varying lengths and are connected to each of the fibers such that at least one fiber along the linear array is a different length than at least one other fiber. In one embodiment, each fiber is 1.5 meters longer than the previous fiber length which in turn causes the travel time of light in each successive fiber to be roughly 7.5 ns longer than its previous neighbor. Adjusting or changing the length of the fiber results in corresponding changes in the time differences between the travel time of light within the fiber. In this embodiment, there are seven optic fibers.

In this embodiment, the output end of these fibers 140 are bundled in a close-packed arrangement in a circular single SMA connector 150 as shown. The fibers 140 may also terminate in a line slit. The output of the fibers 140 from the SMA may be use directly to illuminate a scene of interest, with or without a lens such that each fiber is carrying a slightly different wavelength and due to the different lengths of the optic fibers 140, each wavelength is delayed in time. The output from the bundle of optic fibers 140 can be used to directly illuminate the scene of interest through an optional iris 154, with or without a lens 158, or butt-coupled to a short length of large core (large enough to accept the outputs of all the fibers) fiber (not shown) to mix the outputs and transport the chirped beam. The single, final output is the desired spread chirped pulse.

Although shown as a complete system, it is contemplated that different light sources may be used besides the pump laser and dye cell. Likewise, although shown with various cylindrical lenses, a greater number or fewer number of lenses may be used and lenses of other shapes may be used. Likewise, devices other than an imaging spectrograph may be used where such devices may serve a generally similar function as the imaging spectrograph. In addition, the imaging spectrograph is typically formed from multiple parts and as such, each individual element may be used to perform a generally similar function.

To verify the operational parameters and performance of the proposed design a system was created using the general specifications and items listed below. It should be understood that the specifications and items listed below should not be considered the only configuration and the claims are not limited to this configuration. In this example configuration a pump laser was used with a 10 ns pulse width FWHM and a 532 nm wavelength. Other lasers, pulse widths, and wavelengths can be used. The dye is Rhodamine 6G but in other embodiments other dyes could be used. The solvent is Ethanol but it is contemplated that other solvents can be used, depending on the dye.

The dye laser outputs a 4.5 nm pulse width FWHM and the mode is un-tuned, wide-spectral-line-width. As with the other aspects, this may change across different embodiments. The imaging spectrometer is a Jarrell Ash Mark X with a slit set to 100 microns. For higher power capability, a cylindrical lens can be used at the input, then a relay lens arrangement that includes a spherical plus cylindrical lens must be used at the output to match that of the linear fiber array. The grating in this unit is 200-grooves/mm and the dispersion is 3 nm/mm at the image plane. Other gratings and/or other spectral dispersing instruments can be used to give more or less spectral spreading of the broadband dye laser pulse across the fiber array.

In this embodiment the fiber array is a Thor Labs BFL200HS02 fiber array that includes seven 200-micron core fibers (other sizes or quantities of fibers may be used). The individual fiber output is 0.5 nm FWHM and the spectral range is nominally 4 nm for the seven fibers used in the disclosed embodiment. A pulse of 2 µJ/pulse for brightest fiber, dropping to about 20% of this value for the weakest fiber output. Each fiber length segment was 1.5 m longer than the previous segment. As discussed above, changing the length of the fiber segments will adjust the duration of the resulting chirped pulse and separation between wavelength.

Figure 2:
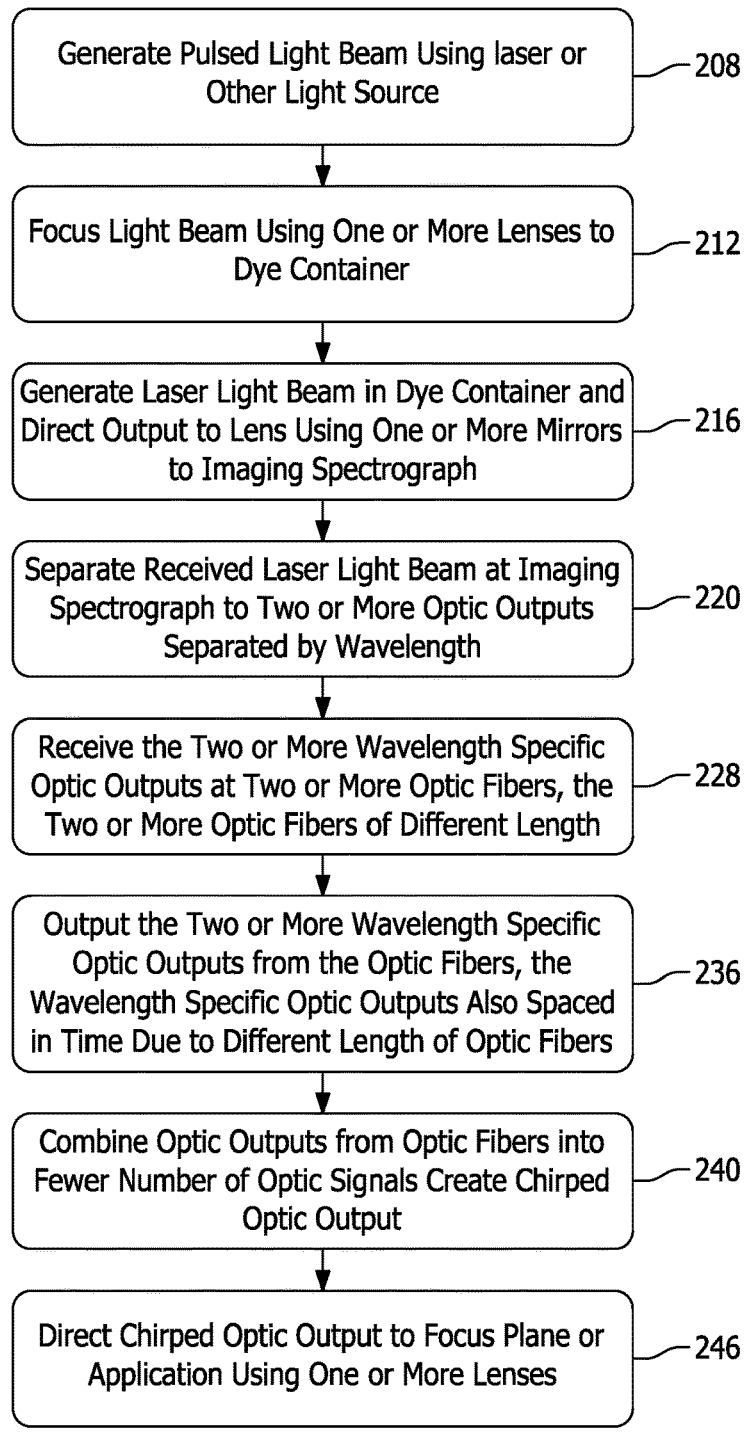
FIG. 2 is an operational flow diagram providing an example method of operation.

FIG. 2 is an operational flow diagram providing an example method of operation. This is but one possible method of operation to create a long chirped pulse based on multiple discrete pulses. At a step 208 a pump laser generates a light beam using a laser or other light source. In other embodiments, other energy sources and types of energy may be used. Next, at a step 212, a lens or other device focuses the light beam to a line shape which is directed to a dye container containing dye, such as a laser dye cell. The dye may comprise any type dye suitable for generating a multiband (multiple wavelength) optic output in response to an exciting input.

At a step 216 the system generates a laser light beam due to the excitation of the dye in the dye cell. The resulting multiband optic signal is directed to one or more lens using one or more mirrors to an imaging spectrograph. At a step 220 the spectrograph separates the received laser light beam in to two or more optic outputs separated or differentiated by wavelength. Thus, the multiband input to the spectrograph is separated or spread based into multiple outputs such that the output optic signals have different wavelengths. Next, at a step 228 the system receives the two or more wavelength specific optic outputs at two or more optic fibers such that the two or more optic fibers are of different length.

At a step 236 the fiber optic cables output the two or more wavelength specific optic outputs from the optic fibers such that the wavelength specific optic outputs are also spaced in time due to different lengths of optic fibers. At a step 240, the system may optionally combine the optic outputs from optic fibers into a fewer number of optic signals to create the chirped optic output. Then, at a step 246 the system may direct the chirped optic output to focus plane or any other application using one or more lenses.

Figure 3:
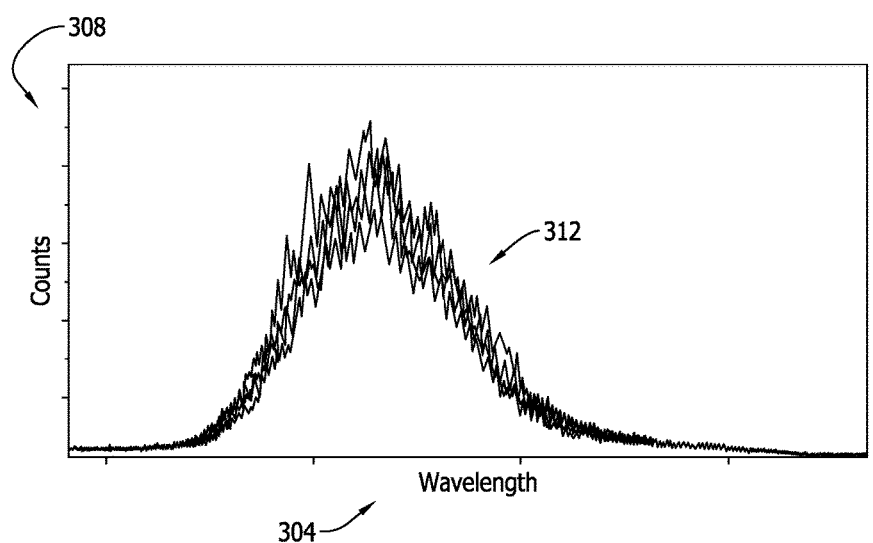
FIG. 3 is a plot of the un-tuned dye laser showing 20 overlapped pulses.

FIG. 3 is a plot of the un-tuned dye laser showing 20 overlapped pulses. In this plot, the horizontal axis 304 represents wavelength in nanometers (nm) and the vertical axis 308 represents relative intensity of the optic signal. The plots 312 represent numerous outputs of the dye laser, which is also the input to the spectrograph. These plots will vary with dye, solvent, concentration, pump power, and other factors.

Figure 4:
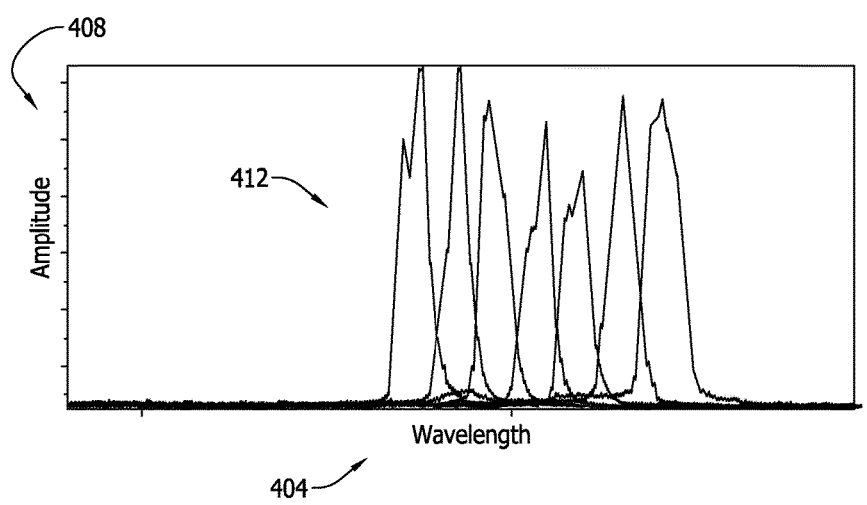
FIG. 4 is a plot of the output of the seven individual fibers in the fiber bundle, each of which are normalized to near 1.0 amplitude.

FIG. 4 is a plot of the output of the seven individual fibers in the fiber bundle, each of which are normalized to near 1.0 amplitude. In this plot, the horizontal axis 404 represents wavelength in nanometers (nm) and the vertical axis 408 represents relative intensity of the plotted optic signal. The various plots 412 are the outputs from the spectrograph and are separate by wavelength by the spectrograph. Small changes in the grating angle can be made to select the region of the broadband dye output that is launched into the fibers.

Figure 5A:
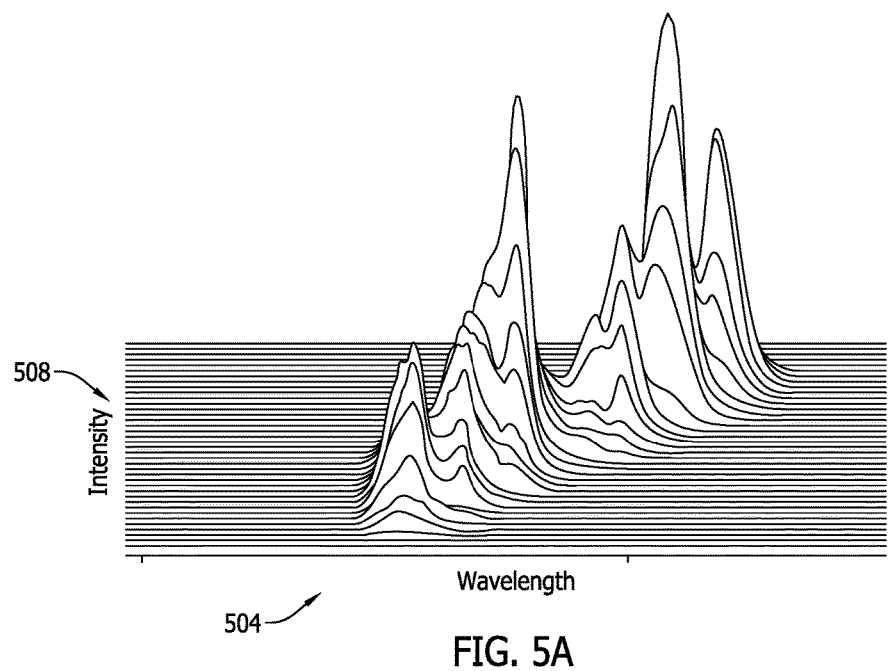
FIGS. 5A and 5B are a plot of the final system output as a function of time.
Figure 5B:
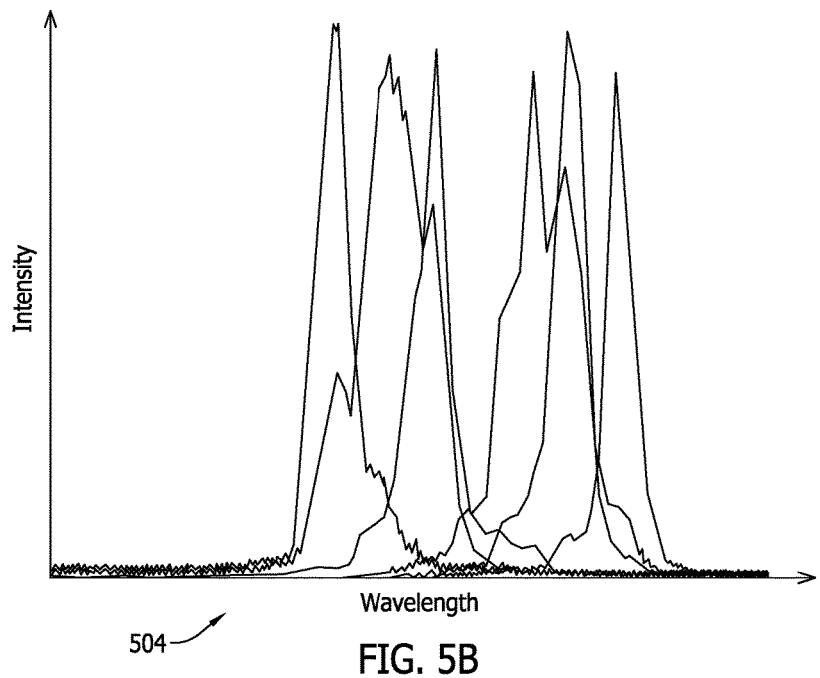

FIGS. 5A and 5B is a plot of the final output as a function of time. In this plot, the horizontal axis 504 represents wavelength in nanometers (nm) and the vertical axis 508 represents relative intensity. FIG. 5A is a three dimensional plot while FIG. 5B is a two dimensional plot. In this plot, the wavelength ranges from approximately 587.5 nm to 591.5 nm. In other embodiments, other wavelength ranges may be used. The z axis represents time in 2 ns steps with a 4 ns gate. Same data is shown in FIG. 5A and FIG. 5B, but each normalized to near full scale. Also, because of the 10 ns FWHM pump laser pulse width and the 4 ns detector gate width, outputs from the separate adjacent fibers are significantly mixed. In other embodiments, greater separation may be established.

The graph shown in FIG. 5B is the same data set as that down in FIG. 5A, but with selected frames (times) only, normalized to 1. The strongest channels are best attenuated somewhat to prevent the spectral "tails" of one channel from competing with the outputs of the weak channels. This results in normalizing all outputs toward 1 at the expense of photons.

It is contemplated that further optimization may be made to create an optimized system. For example, high-power coatings and/or different optics could be used to enable higher pulse energy throughput. A pump laser with half the pulse length may be used to further separate the individual outputs with the existing fiber delays. Another contemplated improvement is a slightly larger space between adjacent fibers in the linear array to thereby decrease channel-to-channel spectral overlap.

Figure 6:
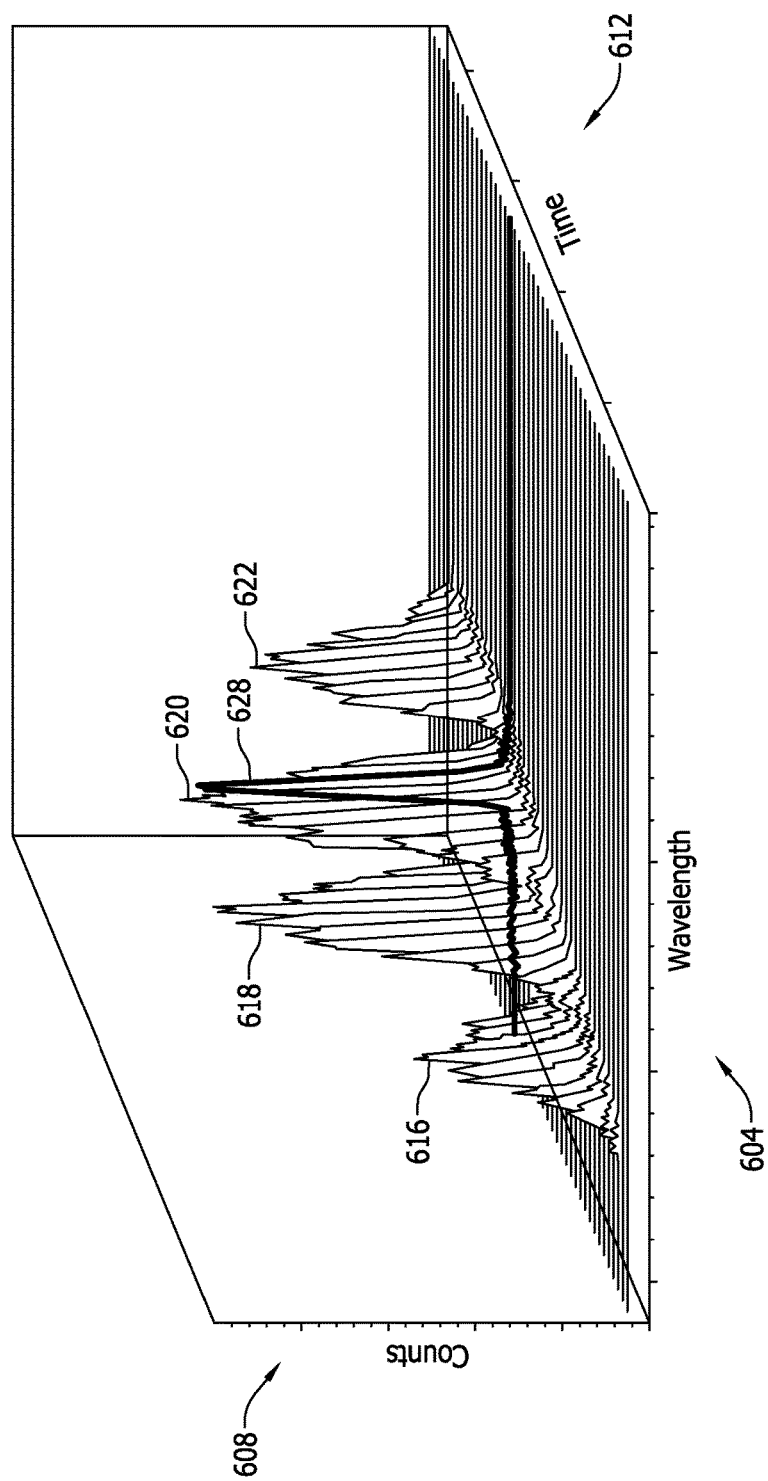
FIG. 6 is a plot of Spectral output as a function of time for a 4-channel system.

In general, for best performance, spectral channels should be reasonably well separated. In one embodiment this is achieved by using a fiber core size somewhat larger than the slit width. In addition, or instead of this option, it is possible to also use a spacer between each fiber in the linear array, assuming a spectrograph with reasonable resolution/dispersion), and the pump laser pulse length can be less than the fiber output temporal spacing delays. Such an output was created and achieved with the existing system by disconnecting fibers 2, 4, and 6 as shown in the plot of FIG. 6. This resulted in a 4-channel system with the desired performance. FIG. 6 is a plot of Spectral output as a function of time for a 4-channel system. In this plot, each frame is a 2 ns increment. The plots 616, 618, 620, 622 are shown in relation to three axis. In this plot the axis 604 represents wavelength in nanometers the axis 608 represents relative intensity, and the axis 612 represents time. The plot line 628 shown in a FIG. 6 represents an instant in time for references purposes.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A device for creating an optic pulse with different wavelengths separated by time comprising:
   a pump laser configured to output an energy pulse;
   a dye cell configured to receive the energy pulse from the pump laser and output a wideband optic pulse comprising a range of wavelengths;
   one or more mirrors configured to direct the wideband optic pulse away from the dye cell;
   a spectrograph having an input and two or more outputs, the spectrograph configured to receive the wideband optic pulse from the dye cell after reflection by the one or more mirrors on the input and convert the optic pulse to a wavelength separated optic signal that are presented on the two or more outputs;
   a first optic cable having an input end and an output end, the input end configured to receive a first output from the spectrograph;
   a second optic cable having an input end and an output end, the input end configured to receive a second output from the spectrograph, the second optic cable having a different length than the first optic cable;
   a coupler configured to combine the light signal from the output end of the first optic cable and the second optic cable to a single path; and
   an iris configured to receive the combined light signal and illuminate a scene of interest with the combined light source.

2. The device of claim 1 further comprising:
   one or more lenses configured to focus the energy from the pump laser to the dye cell; and
   one or more lenses configured to focus the output of the dye cell to the spectrograph.

3. The device of claim 1, wherein the second optic cable is 1.5 meters or more longer than the first optic cable.

4. The device of claim 1 further comprising additional optic cables having an input end and an output end, the input end configured to receive an additional output from the spectrograph, the additional optic cables having a different length than the first optic cable and the second optic cable.

5. The device of claim 1 wherein the output end of the first optic cable and the output end of the second optic cable are contained in one or more SMA connectors.

6. The device of claim 1 wherein the coupler is a large core fiber arranged to accept the first output from the first optic cable and second output from the second optic cable.

7. The device of claim 1 wherein the energy from the pump laser is a 10 ns pulse width at 532 nm wavelength.

8. The device of claim 6 further comprising a fiber core size larger than a slit width of the spectrograph.

9. A device for creating a chirped optic pulse defined as an optic pulse with different wavelengths separated by time comprising:
   a pulse generator configured to output an optic pulse, the optic pulse comprising a multiple wavelength pulse;
   a wavelength dispersive device having an input and two or more outputs, the wavelength dispersive device configured receive the optic pulse on the input and convert the optic pulse to at least one wavelength separated optic signal that is presented on the two or more outputs;

a first optic cable having a first optic cable input and a first optic cable output, the first optic cable input configured to receive a first output from the wavelength dispersive device and present a first optic cable output signal from the first optic cable output;

a second optic cable having an second optic cable input and a second optic cable output, the second optic cable input configured to receive a second output from the wavelength dispersive device and present a second optic cable output signal from the first optic cable output, the second optic cable having a different length than the first optic cable, thereby causing a time shift in the second optic cable output signal as compared to the first optic cable output signal;

a fiber core configured to combine the first optic cable output signal and the second optic cable output signal onto a single core to create a combined light signal; and an iris configured to receive the combined light signal and illuminate a scene of interest with the combined light source.

10. The device of claim 9 further comprising one or more lenses configured to focus the energy from the pump laser and one or more lenses configured to focus the output of the dye cell.

11. The device of claim 9 wherein the second optic cable is 1.5 meters or more longer than the second optic cable.

12. The device of claim 9 wherein the energy from the pump laser is a 10 ns pulse width at 532 nm wavelength.

13. The device of claim 9 further comprising a fiber core size larger than a slit width of the spectrograph.

14. The device of claim 9 wherein the wavelength dispersive device is a spectrograph and the pulse generator generates a multiband pulse.

15. A method for generating a chirped optic pulse comprising:

generating laser pulse, the laser pulse including two or more wavelengths;

receiving the laser pulse at a wavelength dispersive device, the wavelength dispersive device spreading the laser pulse into at least a first output having a first wavelength and a second output having a second wavelength;

receiving the first optic output on a first optic path;

receiving the second optic output on a second optic path, the second optic path having a different length than the first optic path; and outputting a first path output from the first optic path and a second path output from the second optic path to a coupler configured to combine the first path output and the second path output to create a combined light signal; and providing the combined light signal to an iris configured to receive the combined light signal and illuminate a scene of interest with the combined light source.

16. The method of claim 15 wherein the generating a laser pulse comprises providing exciting energy to a dye cell and responsive to the exciting energy, the dye cell outputting the laser pulse.

17. The method of claim 15 further comprising combining the first path output and the second path output onto a single fiber.

18. The method of claim 15 wherein the wavelength dispersive device comprises a spectrograph.

19. The method of claim 15 wherein the first optic path and the second optic path comprise optic fibers.

* * * * *